United States Patent [19]
Dodds

[11] Patent Number: 5,241,391
[45] Date of Patent: Aug. 31, 1993

[54] VIDEO CAMERA SYSTEM FOR RECORDING A SCENE AND A HEAD-UP DISPLAY

[75] Inventor: Roy G. Dodds, Edinburgh, United Kingdom

[73] Assignee: GEC Ferranti Defence Systems Limited, Stanmore, United Kingdom

[21] Appl. No.: 778,331

[22] Filed: Oct. 21, 1991

[30] Foreign Application Priority Data

Oct. 19, 1990 [GB] United Kingdom ............... 9022742

[51] Int. Cl.[5] ............................................. H04N 5/30
[52] U.S. Cl. ...................................... 358/209; 358/93
[58] Field of Search ............... 358/209, 103, 107, 93; 359/630; 340/705, 980

[56] References Cited

U.S. PATENT DOCUMENTS

| | | | |
|---|---|---|---|
| 4,261,012 | 4/1981 | Maloomian | 358/93 |
| 4,380,024 | 4/1983 | Olfsson | 358/93 |
| 4,714,957 | 12/1987 | Takano | 358/93 |
| 4,821,118 | 4/1989 | Lafreniere | 358/108 |

FOREIGN PATENT DOCUMENTS 2065053 6/1981 United Kingdom .

OTHER PUBLICATIONS

Great Britain Search Report, filing date Nov. 19, 1980.

*Primary Examiner*—Michael T. Razavi
*Assistant Examiner*—Toan V. Ho
*Attorney, Agent, or Firm*—Jacobson, Price, Holman & Stern

[57] ABSTRACT

To overcome the problem met with a video recorder for a conventional HUD camera, in which the HUD camera records the view received via the pilot's combiner and in which the symbols can appear too faint to discern in some conditions, separate sensors A and B are provided for the HUD and for the exterior view, and the outputs are electronically combined to produce a combined video signal for recording.

2 Claims, 1 Drawing Sheet

VIDEO CAMERA SYSTEM FOR RECORDING A SCENE AND A HEAD-UP DISPLAY

FIELD OF THE INVENTION

This invention relates to cameras for head-up displays (HUDs).

BACKGROUND OF THE INVENTION

Video cameras have been used to record not only a scene viewed by a pilot on a mission but also the head-up display viewed by the pilot as well (FIG. 1). The camera 1 is positioned on the pilot's side of the combiner 2 (a semi-reflecting, semi-transmitting element) which reflects symbols generated in the head-up display into the pilot's line of sight. The recording may then be used for instruction purposes when the pilot returns to base.

The dynamic range, however, of a video camera is less than that of the human eye, with the result that the HUD symbology may appear too faint on the recording. To alleviate this, it has been proposed to use filters which restrict all colours except those of the HUD symbology, either on the camera or on the combiner, but in either case adequate contrast is not obtained without excessive attenuation of the view of the outside world.

It has also been proposed (GB-A-2065053) to combine electronically signals from a camera for imaging the scene viewed by a pilot and signals for generating a HUD.

SUMMARY OF THE INVENTION

The invention provides a video camera for recording a scene and a head-up display viewed by a pilot, comprising a sensor for viewing the scene, a separate sensor for viewing the HUD, and means for combining the outputs of the sensors to enable a combined video signal to be produced.

Each sensor can be optimised for the radiation it is imaging, and the HUD is then always visible on the recording. The provision of a sensor for viewing the HUD has the result that, if the latter fails but the signals generating it do not, the combined recording does not show the HUD image, in accordance with the pilot's actual view, whereas the last-mentioned prior proposal would record a HUD image which the pilot was unable to see.

BRIEF DESCRIPTION OF THE DRAWINGS

A video camera for recording a scene and a head-up display viewed by a pilot, will now be described by way of example with reference to FIG. 2 of the accompanying drawing, which shows a part of the camera schematically.

DETAILED DESCRIPTION OF THE PREFERRED EMBODIMENTS

Figure 1:
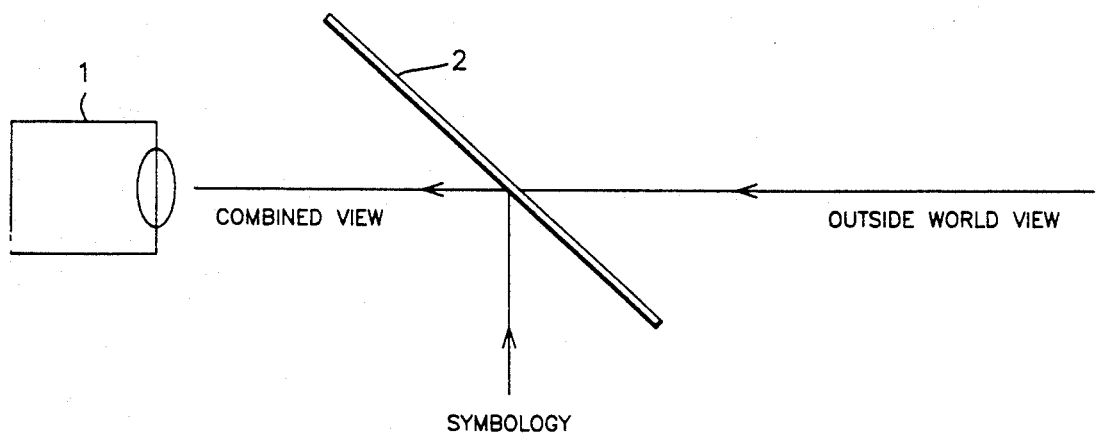
Figure 2:
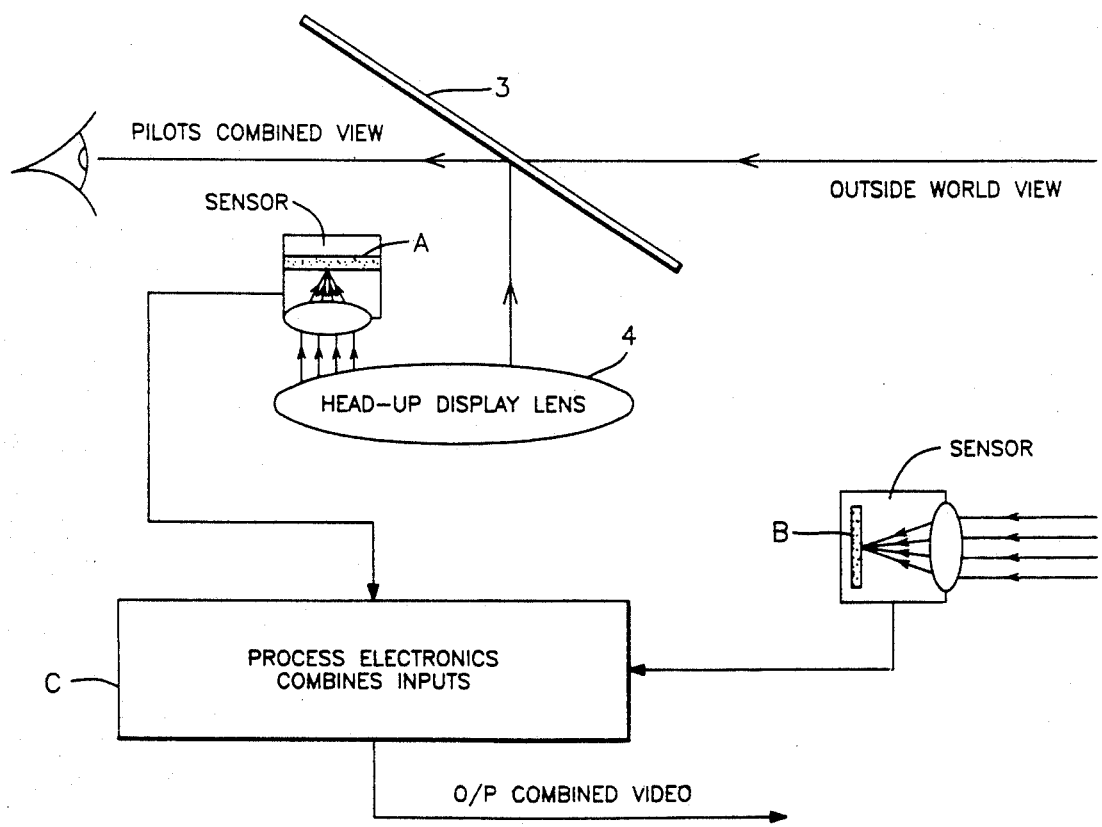

A pilot in the cockpit of an aircraft or helicopter views the scene outside via a semi-transmitting semi-reflecting element 3 referred to as a combiner. A head-up display, only the lens 4 of which is shown, produces symbols which are reflected by the combiner into the pilot's field of view, where they appear at infinity. The symbols displayed may relate to the speed or altitude of the craft, together with details of various instruments which need to be monitored.

In accordance with the invention, two sensors A, B are provided for viewing firstly the head-up display and secondly the scene outside. The sensors may both be solid-state devices e.g. MOS or CCD. Processing electronics C is provided and electronically combines the outputs from both sensors to produce a combined video output, which is then recorded in the normal way on the video recorder.

Because two sensors are provided, it is now possible to optimise them in relation to the image they receive. Thus, the sensor B may be a colour sensor having a resolution of 400 pixels per line by 300 lines or, if desired, a monochrome sensor of 700 pixels per line by 500 lines. The sensor for the head-up display only needs to be monochrome and may be high resolution such as 2,000 pixels per line by 2,000 lines.

Among the advantages of separate sensors for the HUD and the scene outside are that the proportions of the HUD and the outside scene may be easily varied, the HUD channel could be subtracted from the forward view to produce effects such as "black" writing, either or both channels could have image intensifiers fitted to improve low light level performance, and the forward view sensor could be selectable to optimise the performance for ambient conditions e.g. normal vision or infra-red range of operations. The forward view, sensor B may be mounted in any suitable position, and means is provided to ensure correct registration of the sensors A and B.

What is claimed is:

1. A video camera system for recording a scene and a head-up display viewed by a pilot, said video camera system comprising
    an image sensor for directly forward viewing the scene as seen by the pilot and for optimizing radiation said image sensor is imaging,
    a separate image sensor for directly viewing the head-up display as the head-up display is displayed to the pilot and for optimizing radiation said separate image sensor is imaging, and
    means for combining outputs of the image sensors in variable proportions to enable a combined video signal to be produced,
    said image sensors view the head-up display and the forward view directly in the absence of a combiner which combines the forward view with the head-up display for the pilot.

2. A video camera system for recording a scene and a head-up display viewed by a pilot, said video camera system comprising:
    an image sensor for directly viewing the scene as seen by the pilot and for optimizing radiation said image sensor is imaging,
    a separate image sensor for directly viewing the head-up display as the head-up display is displayed to the pilot and for optimizing radiation said separate image sensor is imaging, and
    means for combining outputs of the image sensors in variable proportions to enable a combined video signal to be produced,
    said image sensors being solid-state devices and their respective outputs being electronically combined by said means for combining before being recorded.

* * * * *